United States Patent
Nawaz et al.

(10) Patent No.: US 6,421,694 B1
(45) Date of Patent: *Jul. 16, 2002

(54) SYSTEM AND METHOD FOR DISPLAYING DATA ITEMS IN A TICKER DISPLAY PANE ON A CLIENT COMPUTER

(75) Inventors: Sabina Nawaz, Kirkland; Steven Alfred Isaac, Bellevue; Jay Franklin McLain, Woodinville; Michael H. Tuchen, Seattle; Eric George Jakstadt, Woodinville, all of WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/306,228

(22) Filed: May 6, 1999

Related U.S. Application Data

(63) Continuation of application No. 08/761,664, filed on Dec. 6, 1996, now Pat. No. 5,959,621.

(51) Int. Cl.$^7$ .................... G06F 15/00; G06F 17/24; G06F 17/21
(52) U.S. Cl. .................... 707/526; 707/500.1; 707/513; 345/762
(58) Field of Search .................... 707/526, 500.1, 707/512, 513; 345/329, 747, 762; 340/519

(56) References Cited

U.S. PATENT DOCUMENTS

| | | | |
|---|---|---|---|
| 4,575,579 A | 3/1986 | Simon et al. ............... 178/4 |
| 5,195,031 A | 3/1993 | Ordish ............... 705/37 |
| 5,270,922 A | 12/1993 | Higgins ............... 705/37 |
| 5,276,801 A | 1/1994 | Heyen et al. ............... 345/501 |
| 5,297,032 A | 3/1994 | Trojan et al. ............... 705/37 |
| 5,305,195 A | 4/1994 | Murphy ............... 364/401 |
| 5,339,392 A | 8/1994 | Risberg et al. ............... 345/333 |
| 5,347,632 A | 9/1994 | Filepp et al. ............... 709/202 |
| 5,487,167 A | * 1/1996 | Dinallo et al. ............... 345/302 |
| 5,491,820 A | 2/1996 | Belove et al. ............... 707/3 |
| 5,572,643 A | 11/1996 | Judson ............... 709/218 |
| 5,737,560 A | 4/1998 | Yohanan ............... 345/349 |
| 5,959,621 A | * 9/1999 | Nawaz et al. ............... 345/329 |
| 6,061,695 A | * 5/2000 | Slivka et al. ............... 707/513 |
| 6,084,528 A | * 7/2000 | Beach et al. ............... 340/5.9 |
| 6,091,411 A | * 7/2000 | Straub et al. ............... 345/747 |
| 6,182,098 B1 | * 1/2001 | Selker ............... 707/526 |
| 6,230,172 B1 | * 5/2001 | Purnaveja et al. ............... 707/512 |

FOREIGN PATENT DOCUMENTS

| | | |
|---|---|---|
| EP | 0749081 A1 | 5/1996 |
| WO | WO96/30864 | 3/1995 |

OTHER PUBLICATIONS

Mark A. Kellner, Pointcast brings home endless information, Washington Times, Washington, D.C., Jun. 3,1996, pp. 1–2.*

* cited by examiner

Primary Examiner—Joseph H. Feild
Assistant Examiner—William L. Bashore
(74) Attorney, Agent, or Firm—Klarquist Sparkman LLP

(57) ABSTRACT

A system and method for dynamically displaying data items on a client computer. In one aspect of the invention, the client computer displays a graphical user interface having a windowing environment and a desktop. The desktop includes a ticker display pane for dynamically displaying the data items. The data items may contain hyperlinks so that a user has access to information on multiple server computers. The data items are displayed in a substantially continuous sequence and may be provided from Internet servers, Intranet servers, LAN servers, and/or the client computer itself.

46 Claims, 7 Drawing Sheets

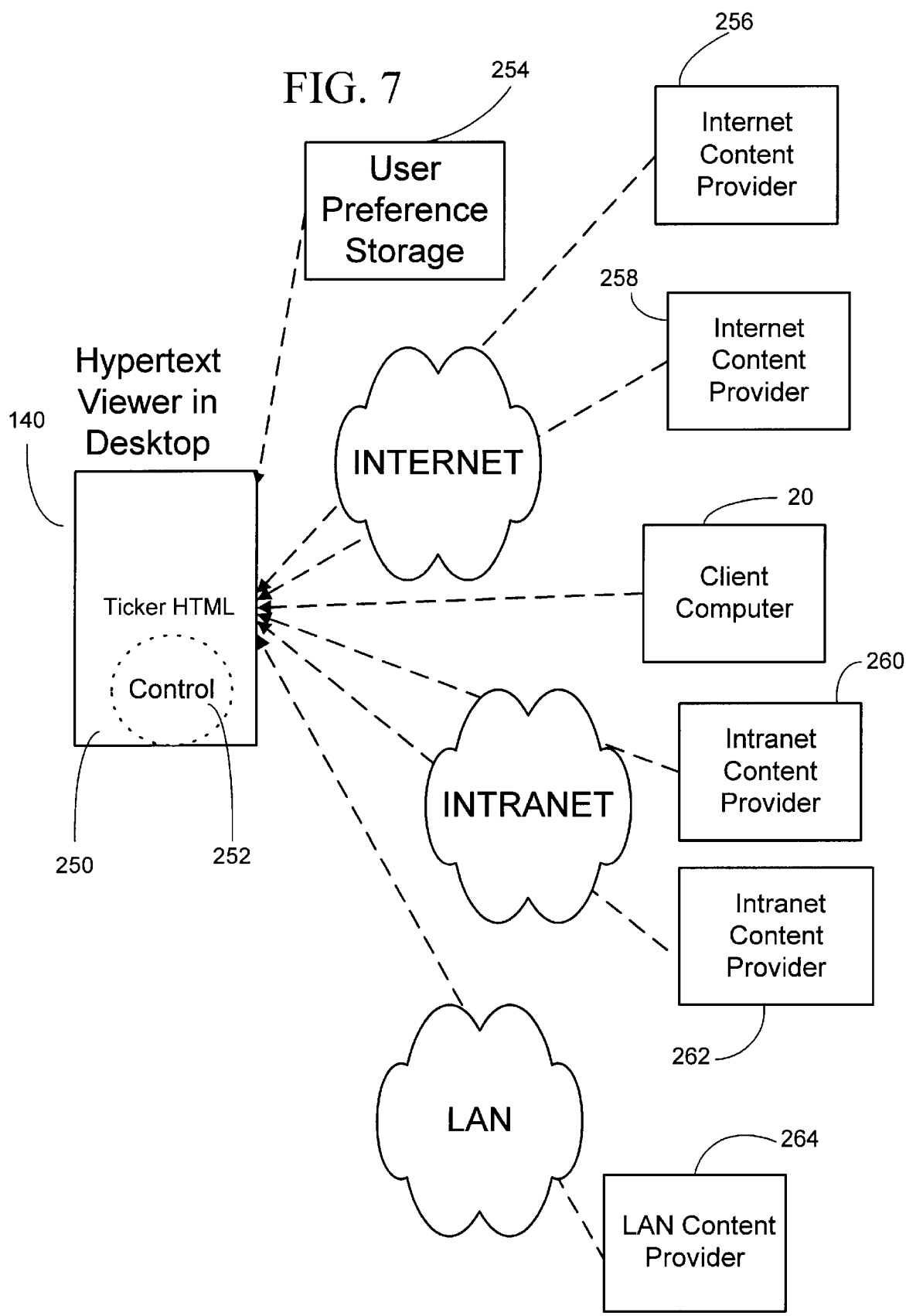

SYSTEM AND METHOD FOR DISPLAYING DATA ITEMS IN A TICKER DISPLAY PANE ON A CLIENT COMPUTER

RELATED APPLICATION DATA

This application is a continuation of U.S. patent application Ser. No. 08/761,664, now U.S. Pat. No. 5,959,621, filed Dec. 06, 1996, issued Sep. 28, 1999 which is hereby incorporated by reference.

FIELD OF THE INVENTION

This invention relates to displaying data on a client computer and, more particularly, relates to displaying the data in a ticker display pane.

BACKGROUND AND SUMMARY OF THE INVENTION

Graphical user interfaces provide an icon-oriented and/or menu-driven environment for allowing a user to interact with an operating system running on a user's computer. Many graphical user interfaces include a windowing environment and a desktop. A windowing environment presents the user with specially delineated areas called windows on a display, each of which is dedicated to a particular application program, file or document. The windows can typically be re-sized, moved around on the display, and stacked so as to overlay other windows. The windowing environment allows windows to be increased to a full-screen display or minimized, meaning the window is reduced to and denoted by an icon.

The desktop displays icons representing programs, files and resources available to the user. As such, the desktop acts as a launching point for running application programs, opening documents or files, and initiating operating system services. The desktop cannot be minimized or closed. Instead, the desktop always remains as a full-screen background display upon which windows overlay.

The desktop in many graphical user interfaces is based on a desktop metaphor, wherein the desktop is a graphical work surface analogous to a surface of a desk. Similarly, windows overlay the desktop in the graphical user interface analogous to papers or files laying on top of the desk.

One area that may use a graphical user interface is Internet-based applications. The Internet is a worldwide collection of cooperating computer networks. A user typically accesses the Internet through a "client" computer. The client computer communicates with a "server" computer on a remote computer network using telephone, ISDN, or T1 lines or similar physical connections. The server computer may download content (e.g., images, text, application programs, etc.) to the client computer for viewing or execution by the user.

The client and server computers communicate through software protocols, such as File Transfer Protocol (FTP), Simple Mail Transfer Protocol (SMTP), Hypertext Transfer Protocol (HTTP), Gopher, etc. Currently HTTP is the most widely used protocol and is used for accessing the World Wide Web.

The World Wide Web is a portion of the Internet consisting of server computers, also referred to as "sites," which make multi-media documents (often referred to as content) in HTML format generally available for downloading or retrieval by individuals having a computer with Internet access. The documents are generally created in Hypertext Markup Language (HTML) and displayed on a user's computer. HTML documents support embedded hyperlinks that reference other locations (folder, FTP site, other HTML documents, etc.). The user's computer retrieves and displays documents associated with the other location when the user activates a hyperlink by clicking on the hyperlink or pressing an appropriate keystroke.

Uniform Resource Locators (URL) are used in conjunction with hyperlinks to identify the referenced location. URLs typically define a protocol to be used, a domain name of a server computer, a port address to be used for communication, and a directory path to access a desired document. Thus, when a user activates a hyperlink, the user's computer uses a URL to establish communication with a server computer designated in the URL and displays a document retrieved from the server.

HTML also allows graphical images to be embedded in HTML documents. When a graphical image is embedded in an HTML document, the dimensions or size of the embedded graphical image may be defined with HTML statements. For example, the size of an embedded graphical image may be defined in HTML by <IMG SRC="file.gif" WIDTH=X HEIGHT=Y>, where IMG is an HTML tag referencing an embedded image, SRC="file.gif" defines the location and name of the file containing the graphical image embedded in the HTML document, (e.g., a Graphics Information file or *.GIF) and X,Y are the respective width and height of the graphical image measured in pixels.

Software object components also may be used with HTML documents for displaying executable content, such as for animations or information processing. Currently, most Internet browsers support embedded software object components in the form of ActiveX controls, Java applets, and Visual Basic Scripts. These software object components are embedded into HTML documents using the <Insert> or <Object> HTML tags.

The above-described protocols and HTML documents are the underlying structure for many Internet-based applications. One such Internet-based application achieving widespread success is called Internet broadcasting. Internet broadcasting effectively turns a computer into a high-tech television set, allowing a client computer to change "channels" for displaying news, sports scores, stock charts, weather updates and other kinds of information which are downloaded from the Internet. The information displayed for the channels is dynamically updated, such as through scheduled or manually initiated downloads.

One provider of an Internet broadcasting application is PointCast Inc. PointCast provides an Internet broadcast application on its Internet site (http://www.pointcast.com) that a user can download to the user's computer. The Internet broadcast application executes as a windowed application on the user's computer. In the application's window, the Pointcast application displays a channel viewer. The channel viewer contains different panes for organizing and reading news. One pane lists a collection of channels encompassing such topics as companies, industries, life styles, news, and sports. When a user activates a channel, a second pane is displayed showing a list of current stories relating to the selected channel. If a user activates a story, the full text for that story is displayed on a third pane. The PointCast application also includes what is called a "SmartScreen" that is triggered after a preset period of inactivity (as in a screen saver). SmartScreen launches a collection of headlines, sports scores, and stock tickers.

The PointCast application has several drawbacks. For example, all of the content displayed is delivered from a single. server computer called the Internet broadcasting server (e.g., the PointCast server), rather than directly from content providers that create the content. Thus, the information provided is only as up-to-date as the Internet broadcasting server. Additionally, if a user is interested in viewing content that is not available on the Internet broadcasting server, there is no means for integrating that content into the Internet broadcast. For example, content from other Internet server computers, Intranet server computers, server computers on Local Area Networks (LAN), and the client computer itself, cannot be integrated into the broadcast. The content displayed also lacks hyperlinks referencing documents on other server computers and allowing a user to obtain more information about an item displayed in the Internet Broadcast.

Additionally, the PointCast application is displayed in one of many possible open windows., Returning to the desktop metaphor, a user may find it difficult to find documents, such as papers or files, lying on top of a desk when the desk is cluttered with such documents. Similarly, in windows environments wherein a user can have a plurality of windows opened simultaneously, the user may lose track of which window a particular application is displayed. Being opened in a window, the PointCast application is susceptible to this problem.

The present invention provides a ticker display pane as part of a desktop on a client computer. The desktop is called an "active" desktop because data is animated (e.g., scrolling) in the ticker display pane. The ticker data is updated automatically by retrieving the data directly from content providers. The ticker data also may contain hyperlinks and be sourced from multiple servers on multiple networks.

In one aspect of the invention, a client computer provides a ticker display pane as part of the desktop for displaying data, such as stock prices, sport scores, and messages. The data is displayed in a substantially continuous sequence of discrete data items that are animated in the ticker display pane. For example, the data items may scroll across the ticker display pane or flash onto the display pane all at once, filling the display pane. Because the ticker display pane is part of or integrated into the desktop, the user does not need to open a separate window to display the data items. Additionally, the user always knows the location of the ticker display on the desktop, as opposed to the ticker display being lost as one of many possible open windows.

In another aspect of the invention, the data is retrieved from one or more source computers (i.e., multiple providers), which may be located on different computer networks. For example, server computers may be Internet, Intranet or LAN server computers. Additionally, information from multiple topic areas, such as sports, entertainment, stocks, and inter-corporate messages can be integrated into the substantially continuous sequence of data items. In this aspect of the invention, the ticker display pane may or may not be part of the desktop (e.g., the ticker may be in a separate window).

In another aspect of the invention, the data retrieved contains hyperlinks, thereby allowing a user to select a hyperlink to retrieve and display another document (e.g., folder, HTTP or FTP site, other HTML documents, etc.) designated by the hyperlink.

In yet another aspect of the invention, a source identifier may be integrated into the desktop. The source identifier displays an image associated with the source of the data items currently displayed on the ticker display. The source identifier may include a hyperlink. Upon activating the hyperlink (e.g., clicking on the source identifier), the system retrieves and displays a document on a server computer associated with the hyperlink. The source identifier may further be an HTML page allowing the content provider to place advertisements and other information in a display space for the source identifier.

Thus, using the present invention, rich multimedia data is dynamically integrated directly into the desktop on a client computer. The data may be provided from multiple server computers on multiple networks, such as Internet servers, Intranet servers, LAN servers, etc. Further, the data may include hyperlinks allowing the user to browse to related documents on a computer network. Finally, the data displayed is the most up-to-date content, since it is provided directly from the content providers.

Additional features and advantages of the invention will be made apparent from the following detailed description of an illustrated embodiment which proceeds with reference to the accompanying drawings.

BRIEF DESCRIPTION OF THE DRAWINGS

FIG. 7 is an illustration of a desktop viewer sequencing through data provided from Internet servers, Intranet servers, LAN servers and the client computer.

DETAILED DESCRIPTION OF THE ILLUSTRATED EMBODIMENTS

1. Computer Overview

Figure 1:
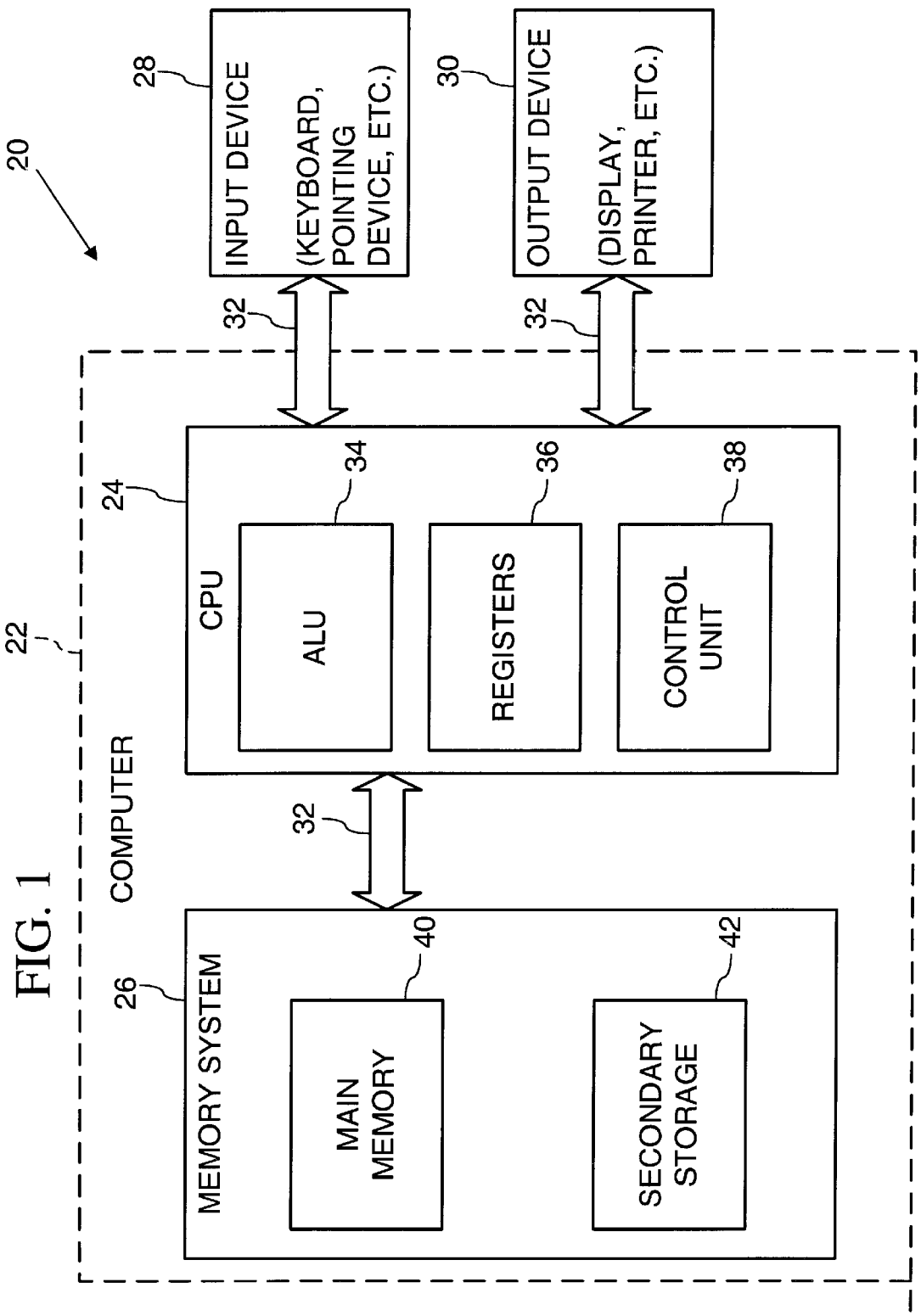
FIG. 1 is a block diagram of a computer system that may be used to implement a method and apparatus embodying the invention for displaying a ticker display pane.

Referring to FIG. 1, an operating environment for an illustrated embodiment of the present invention is a computer system 20 with a computer 22 that comprises at least one high speed processing unit (CPU) 24, in conjunction with a memory system 26, an input device 28, and an output device 30. These elements are interconnected by at least one bus structure 32.

The illustrated CPU 24 is of familiar design and includes an ALU 34 for performing computations, a collection of registers 36 for temporary storage of data and instructions, and a control unit 38 for controlling operation of the system 20. The CPU 24 may be a processor having any of a variety of architectures including Alpha from Digital, MIPS from MIPS Technology, NEC, IDT, Siemens, and others, x86 from Intel and others, including Cyrix, AMD, and Nexgen, and the PowerPc from IBM and Motorola.

The memory system 26 generally includes high-speed main memory 40 in the form of a medium such as random access memory (RAM) and read only memory (ROM) semiconductor devices, and secondary storage 42 in the form of long term storage mediums such as floppy disks, hard disks, tape, CD-ROM, flash memory, etc. and other devices that store data using electrical, magnetic, optical or other recording media. The main memory 40 also can include video display memory for displaying images through a display device. Those skilled in the art will recognize that the memory 26 can comprise a variety of alternative components having a variety of storage capacities.

The input and output devices 28, 30 also are familiar. The input device 28 can comprise a keyboard, a mouse, a physical transducer (e.g., a microphone), etc. The output device 30 can comprise a display, a printer, a transducer (e.g., a speaker), etc. Some devices, such as a network interface or a modem, can be used as input and/or output devices.

As is familiar to those skilled in the art, the computer system 20 further includes an operating system and at least one application program. The operating system is the set of software which controls the computer system's operation and the allocation of resources. The application program is the set of software that performs a task desired by the user, using computer resources made available through the operating system. Both are resident in the illustrated memory system 26.

In accordance with the practices of persons skilled in the art of computer programming, the present invention is described below with reference to acts and symbolic representations of operations that are performed by computer system 20, unless indicated otherwise. Such acts and operations are sometimes referred to as being computer-executed. It will be appreciated that the acts and symbolically represented operations include the manipulation by the CPU 24 of electrical signals representing data bits which causes a resulting transformation or reduction of the electrical signal representation, and the maintenance of data bits at memory locations in memory system 26 to thereby reconfigure or otherwise alter the computer system's operation, as well as other processing of signals. The memory locations where data bits are maintained are physical locations that have particular electrical, magnetic, or optical properties corresponding to the data bits.

2. Object Overview

Figure 2:
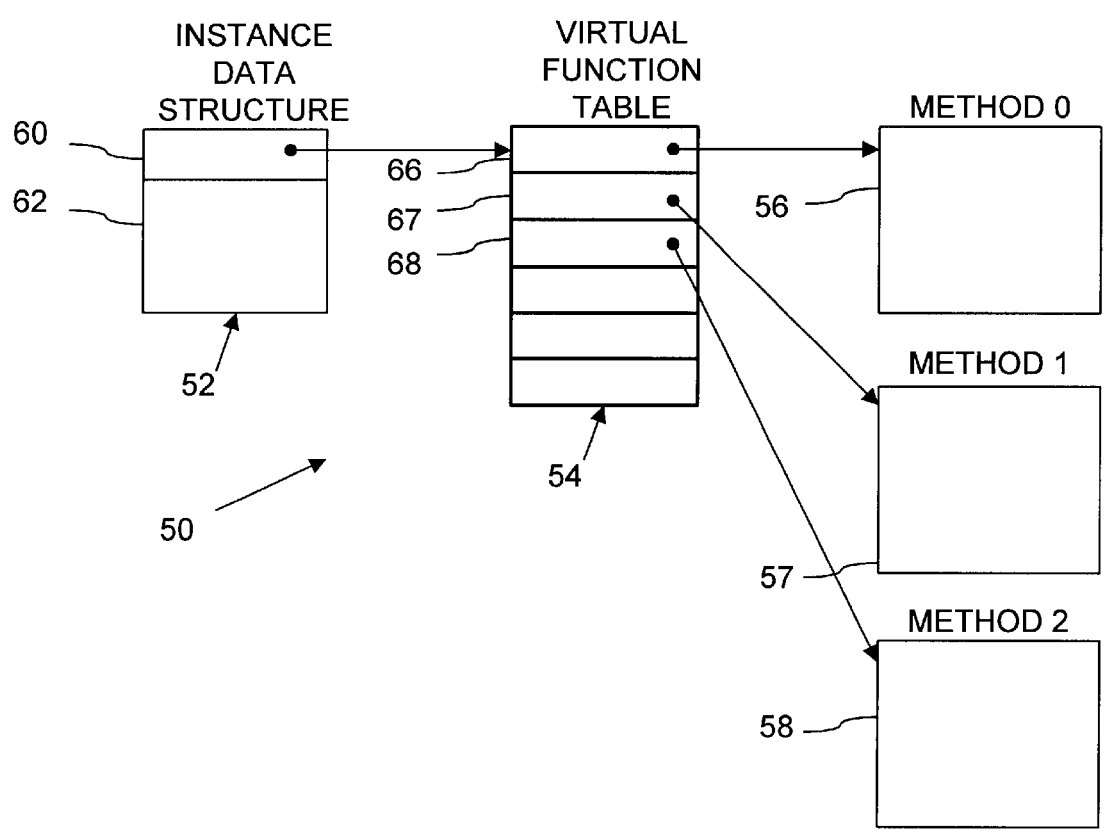
FIG. 2 is a block diagram illustrating objects conforming to a component object model used in the present invention.

Referring to FIG. 2, the illustrated embodiment of the invention utilizes objects or controls which conform to the component object model (COM) of Microsoft Corporation's OLE. For a detailed discussion of OLE see *Inside OLE, Second Edition* by Kraig Brockschmidt, Microsoft Press, Redmond, Wash. 1995. A brief overview of objects in OLE and associated terminology is provided below before discussing the details of the illustrated embodiment.

An object is an instance of a programmer-defined type referred to as a class, which exhibits the characteristics of data encapsulation, polymorphism and inheritance. Data encapsulation refers to the combining of data (also referred to as properties of an object) with methods that operate on the data (also referred to as member functions of an object) into a unitary software component (i.e., the object), such that the object hides its internal composition, structure and operation and exposes its functionality to client programs that utilize the object only through one or more interfaces. An interface of the object is a group of semantically related member functions of the object. In other words, the client programs do not access the object's data directly, but must instead call functions on the object's interfaces to operate on the data.

Polymorphism refers to the ability to view (i.e., interact with) two similar objects through a common interface, thereby eliminating the need to differentiate between two objects. Inheritance refers to the derivation of different classes of objects from a base class, where the derived classes inherit the properties and characteristics of the base class (which for purposes of OLE are the interfaces of the base class).

OLE's COM specification defines binary standards for objects and their interfaces which facilitate the integration of software components. According to the COM specification, a typical object 50 is represented in the computer system 20 (FIG. 1) by an instance data structure 52, a virtual function table 54, and member functions 56–58. The instance data structure 52 contains a pointer 60 to the virtual function table 54 and data 62 (also referred to as data members, or properties of the object). A pointer is a data value that holds the address of an item in memory. The virtual function table 54 contains entries 66–68 for the member functions 56–58. Each of the entries 66–68 contains a reference to the code 56–58 that implements the corresponding member function.

The pointer 60, the virtual function table 54, and the member functions 56–58 implement an interface of the object 50. Client programs interact with the object 50 by obtaining a pointer (referred to as an interface pointer) to the pointer 60 of the virtual function table 54. OLE includes a type definition of an interface pointer which allows client programs to call member functions on the interface by name through the interface pointer and provides type checking on the function's arguments, as expressed in the following code (in the C++ programming language):

pInterface->MemberFunction( . . . )

Interfaces conventionally are given names beginning with a capital "I". Objects can include multiple interfaces which are implemented with one or more virtual function tables. The member function of an interface is denoted as "IInterfaceName::FunctionName."

The object 50 conforming to the COM specification exhibits data encapsulation by exposing its interfaces (semantic groupings of its member functions) to client programs. The client programs interact with the object 50 by calling the member functions 56–58 on a particular interface of the object, but do not directly manipulate the object's data. The object 50 also exhibits polymorphism and inheritance in that the object 50 can provide interfaces in common with a base class and other similar objects, so that client programs can interact with each of the objects in the same manner by calling member functions of the interface that the objects have in common.

3. Graphical User Interface with a Windowing Environment and a Desktop

Figure 3:
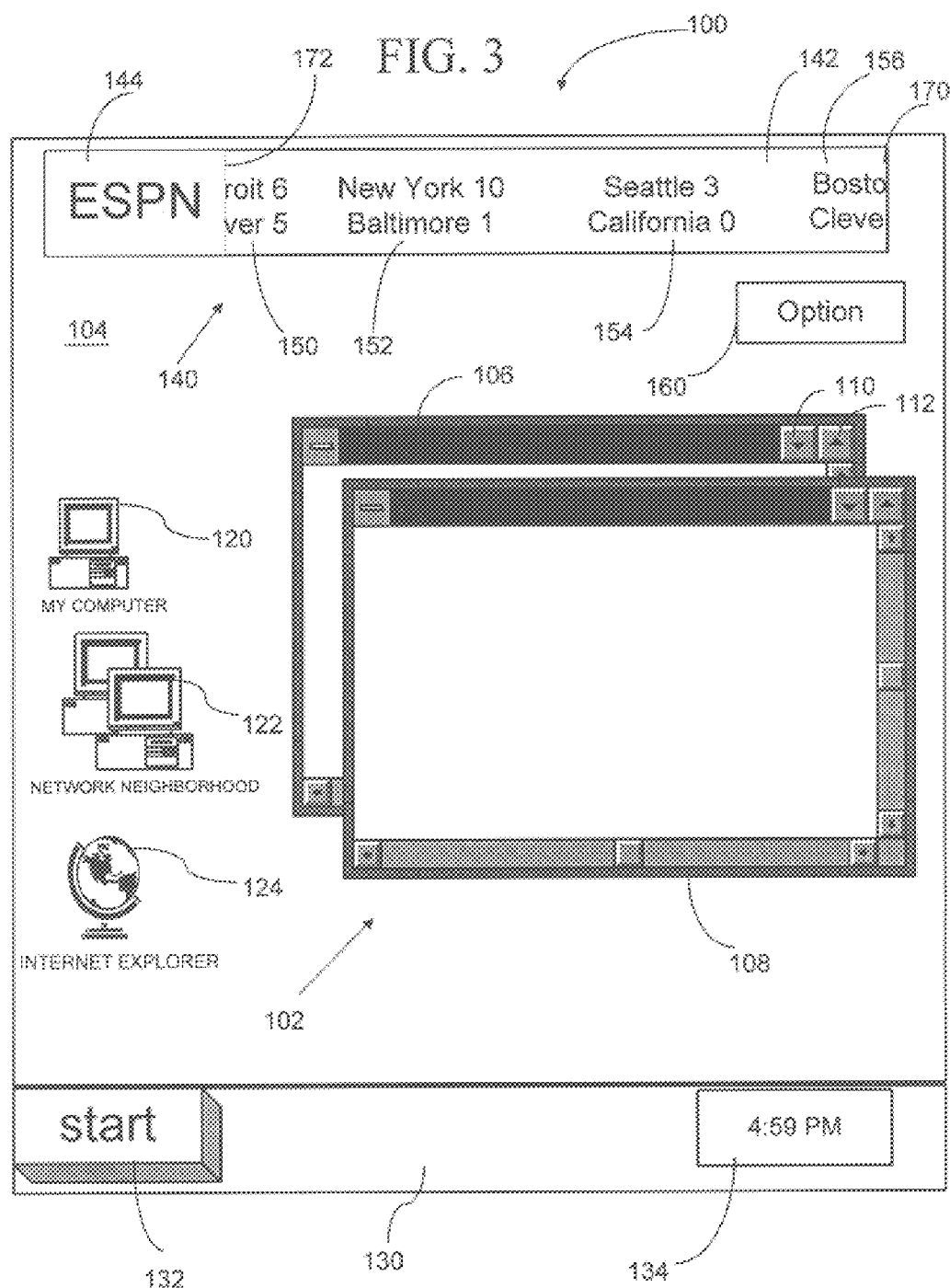
FIG. 3 is an illustration of a graphical user interface according to one aspect of the invention including a desktop with a ticker display pane for displaying a plurality of data items.

Referring to FIG. 3, a graphical user interface environment 100 according to the present invention is shown. The graphical user interface is displayed on the computer display 30 (FIG. 1) and includes a windowing environment for displaying windows 102 and a desktop 104. The windowing environment shown is that of the Microsoft Windows 95 or Windows NT 4.0 operating systems, but the invention is equally applicable to other windowing environments.

The illustrated graphical user interface is displaying two windows 106, 108 overlaying the desktop 104 in a front-to-back order. Each window represents a separate application, file or document. Window 108 is the front-most window, and, as such, is the window which accepts user input. The user can switch other windows to the front by clicking with a mouse or other pointer device, or by inputting certain key combinations. This allows the user to work with multiple application programs, files and documents. Windows 106 and 108 each have minimize and maximize buttons, such as buttons 110 and 112 on window 106, so that the windows can be reduced to an icon or expanded to full-screen, filling the graphical user interface display.

The illustrated desktop includes desktop icons, such as a "My Computer" icon 120, a "Network Neighborhood" icon 122 and an "Internet Explorer" icon 124. Other desktop icons are typically displayed on the desktop 104, but are not shown for purposes of simplicity. The icons represent programs, files and resources available to the user. The desktop icons are illustrative only and entirely different icons may be used.

The desktop 104 also includes a task bar 130 which extends the length of the desktop at a bottom-most portion thereof. The task bar 130 includes a start button 132 and a clock 134. Upon clicking the start button 132, a menu (not shown) appears containing user-selectable commands, such as for running programs, shutting down the computer, and displaying folders. Icons or buttons (not shown) representing currently running applications are also displayed in the task bar.

Elements on the desktop 104, such as the desktop icons 120, 122 and 124, can be moved to other locations on the desktop by dragging and dropping with a mouse or other pointer device, but cannot be minimized any further. Applications which are open in the windows 106, 108, on the other hand, can be minimized. To "minimize" an application means to remove all windows associated with that application from the display such that only an icon or other graphical element remains displayed in the task bar representing the application. Minimized applications are still active and may run in the background. The desktop remains as a full-screen display when all applications or programs are minimized or closed.

The desktop 104 includes a viewer 140 which is a hypertext viewer used to display hypertext data, such as HTML data. The viewer 140 views a ticker HTML document for displaying a ticker display pane 142 and a source identifier 144. The ticker display pane displays a plurality of discrete data items, such as data items 150, 152, 154 and 156 within the desktop. The source identifier 144 identifies a content provider that is currently sourcing or providing the data items being displayed.

The discrete data items can be displayed in the ticker display pane using a variety of techniques. In each technique, the data items are animated meaning they appear in motion during a portion of their display. For example, the data items can rotate into the ticker display pane from the bottom or the top thereof. Or the data items can flash onto the ticker display pane, meaning a first set of data items is displayed all at once for the full width of the display area and then a second set is displayed all at once on the display overriding the first set, etc.

In the illustrated ticker display pane 142, the data items are scrolling from right to left across the ticker display pane. Multiple data items are displayed simultaneously on the ticker display pane. The ticker display pane 142 contains a first end 170 and a second end 172. The data items automatically move from right to left across the ticker display pane portion of the viewer scrolling onto the ticker display pane from the first end 170 and scrolling off of the second end 172. The illustrated ticker display pane is currently displaying sports scores with data item 156 moving onto and data item 150 moving off of the ticker display pane. The data items scroll across the display at a default speed, but the user may select variable speeds through a control menu (not shown).

Although shown moving right to left, data items may alternatively move from left to right. The ticker display pane also may be oriented in any desired direction on the desktop, such as vertically, rather than horizontally on the desktop. Whether vertically or horizontally, when scrolling, the data items are considered moving across the desktop.

The data items are typically sourced from multiple content providers. The data is displayed in a substantially continuous sequence with data items displayed one after another until all of the data from a current content provider is completed. As the last data item from the current content provider moves off the left end of the ticker display pane, data items from the next content provider begin to move onto the ticker display pane from the right end, and the source identifier 144 is updated accordingly. When the last data item from the last content provider is displayed, data items from the first content provider are re-displayed and the cycle repeats. Thus, the data is sequentially displayed in a substantially continuous and seamless manner. The term "substantially continuous" is used to account for minor transitions that occur between content providers. This term includes a continuous display as well, wherein no transitions exist between content providers.

The data may be downloaded from the content providers through regularly scheduled downloads. Alternatively, the user may choose to update information when the user selects a proper keystroke or chooses a menu item. The data may also be downloaded during idle time, such as when a user is reading currently downloaded data.

The data displayed in the viewer can relate to different topics of information, such as sports, business, weather, stock information, etc. The different topics correspond to user-selected channels chosen from the channel guide (described further below). Messages from other users on a computer network also can be displayed. As will be further described below, the substantially continuous sequence of data items can include data items provided by multiple servers on multiple networks, such as LAN servers, Intranet servers and Internet servers. The client computer also can source data items for display in the ticker display pane.

The length of the data items is variable, and the data items displayed may include hyperlinks for retrieving and displaying documents related to the data item. For example, selecting data item 152 may provide more information about the New York vs. Baltimore game.

The source identifier 144 displays the source of the currently displayed data items. For example, data items 150, 152, 154, and 156 are the current data items being displayed and are sourced from ESPN. When the viewer finishes displaying the data items for ESPN, a new logo appears for a new content provider sourcing the data items. The source identifier can be a graphic with a hyperlink embedded therein for allowing a user to retrieve and display a document associated with the source identifier (e.g., ESPN home page) upon activation of the hyperlink. The source identifier alternatively may be an HTML page for allowing the provider to place advertisements and other information.

The desktop also includes an option button 160 for customizing content provided in the viewer. Activating the option button 160 results in an option menu being displayed. From the options menu a user can select the channel guide allowing a user to select different content providers to source data items to the ticker display pane.

The channel is divided into channels (not shown). The channels correspond to different topics of information, such as sports, entertainment, etc and/or different content providers. The channel guide provides a list of content providers relating to a desired channel and allows a user to choose which content providers will display data in the viewer 140.

Further details of how the channel guide operates are described in a patent application entitled "SYSTEM AND METHOD FOR INTEGRATING A DOCUMENT INTO A DESKTOP WINDOW ON A CLIENT COMPUTER" having application number Ser. No. 08/760,931, which is hereby incorporated by reference.

The viewer 140, icons 120, 122, 124 and the option button 160 are all integrated into the desktop meaning they are a part of the desktop. Thus, the ticker display pane and the data items are displayed on the desktop as opposed to being displayed in an application window. Alternatively, the ticker display pane may be in a separate application window. When in a separate window, the ticker display pane may be minimized like any other window.

4. Network Messages Displayed on the Ticker Display Pane

Figure 4:
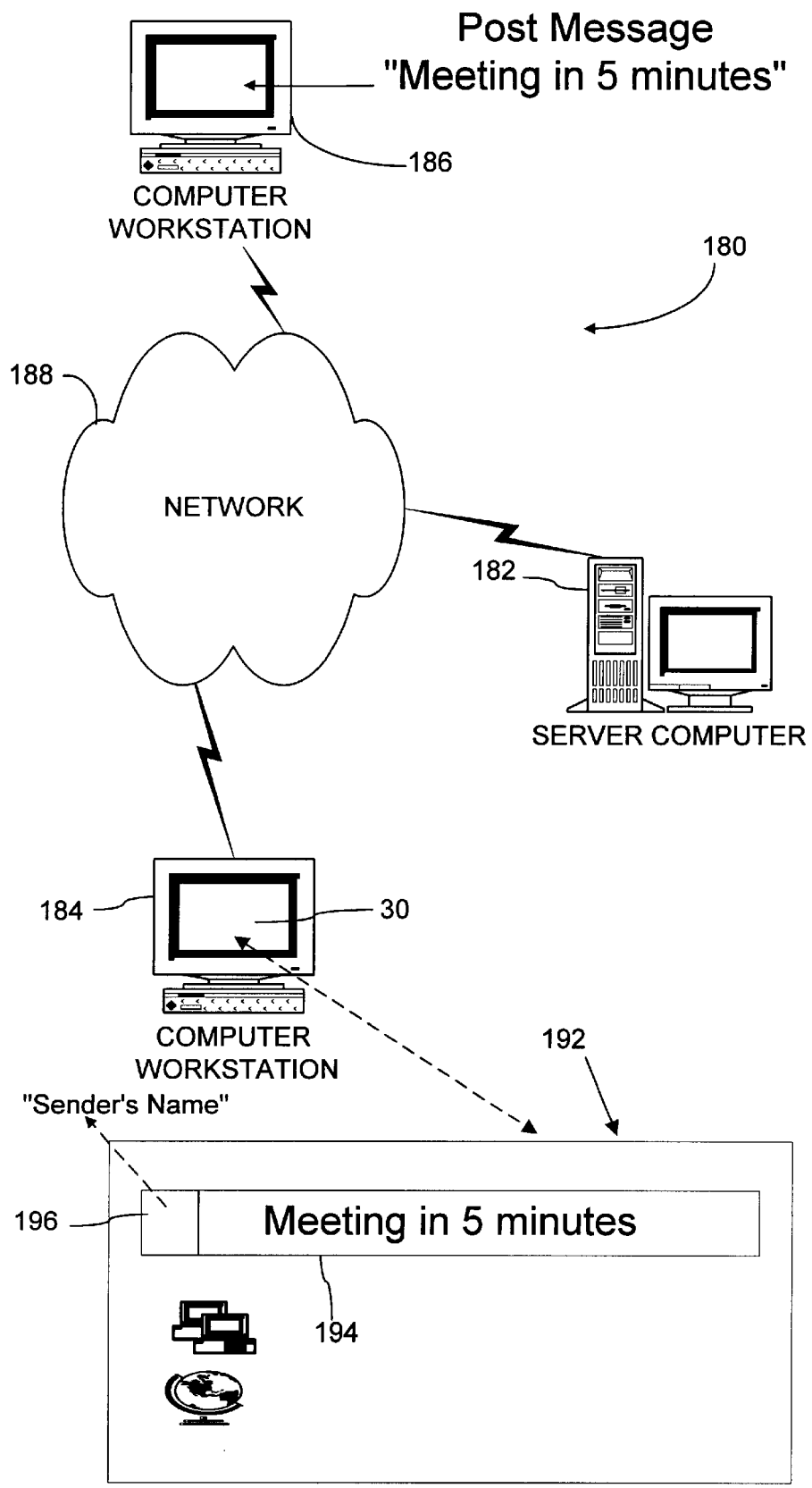
FIG. 4 is an illustration of a network having a plurality of workstations capable of sending messages therebetween for display on the ticker display pane.

FIG. 4 shows a system 180 having a server computer 182 and a plurality of computer workstations 184, 186 coupled together by a network 188. The network 188 can be an Internet, Intranet, or a LAN. Other types of networks may also be used. Additionally, computer workstations from other networks can be connected to the network 188 through server computer 182. The computer workstations may be connected to the network using a variety of hardware, such as a modem, an ethernet network connector, or a token-ring network connector.

The computer workstation 184 is shown with a graphical user interface displaying a desktop 192 (details of the desktop shown in FIG. 3 are not illustrated for simplicity). The desktop includes a ticker display pane 194 for displaying messages sent over the system 180 and a source identifier 196. The ticker display pane may be a part of the desktop or, alternatively, the ticker display pane may be in a window.

Using the system 180, a user on computer workstation 186 can "post" a message, meaning send a message to other computer workstations on the system. In the illustrated system, a message is posted from computer workstation 186 stating "meeting in 5 minutes." The message is transferred to computer workstation 184 through server 182 and displayed on the ticker display pane 194.

The message displayed on computer workstation 184 is integrated into a scrolling sequence of data items provided from other content providers, as described above. For purposes of illustration, the source identifier 196 is updated to indicate the name of the user sending the message.

The computer workstation 184 also can post messages on the ticker display pane 194. To post messages, software running on the computer workstation 184 can interact with other applications, such as standard mail or scheduling applications (e.g., Lotus Notes, Groupwise or Microsoft Mail). Alternatively, dedicated software for ticker displays can be used for mail or scheduling. In either case, a scheduling application can post reminders at desired times (e.g., "meeting at 3:00") on the ticker display pane. Additionally, if high priority e-mail messages are received, a message can be posted on the ticker display pane stating that mail has been received. Furthermore, operating system notices, such as "hard drive full" or network status can be posted on the ticker display pane.

Figure 5:
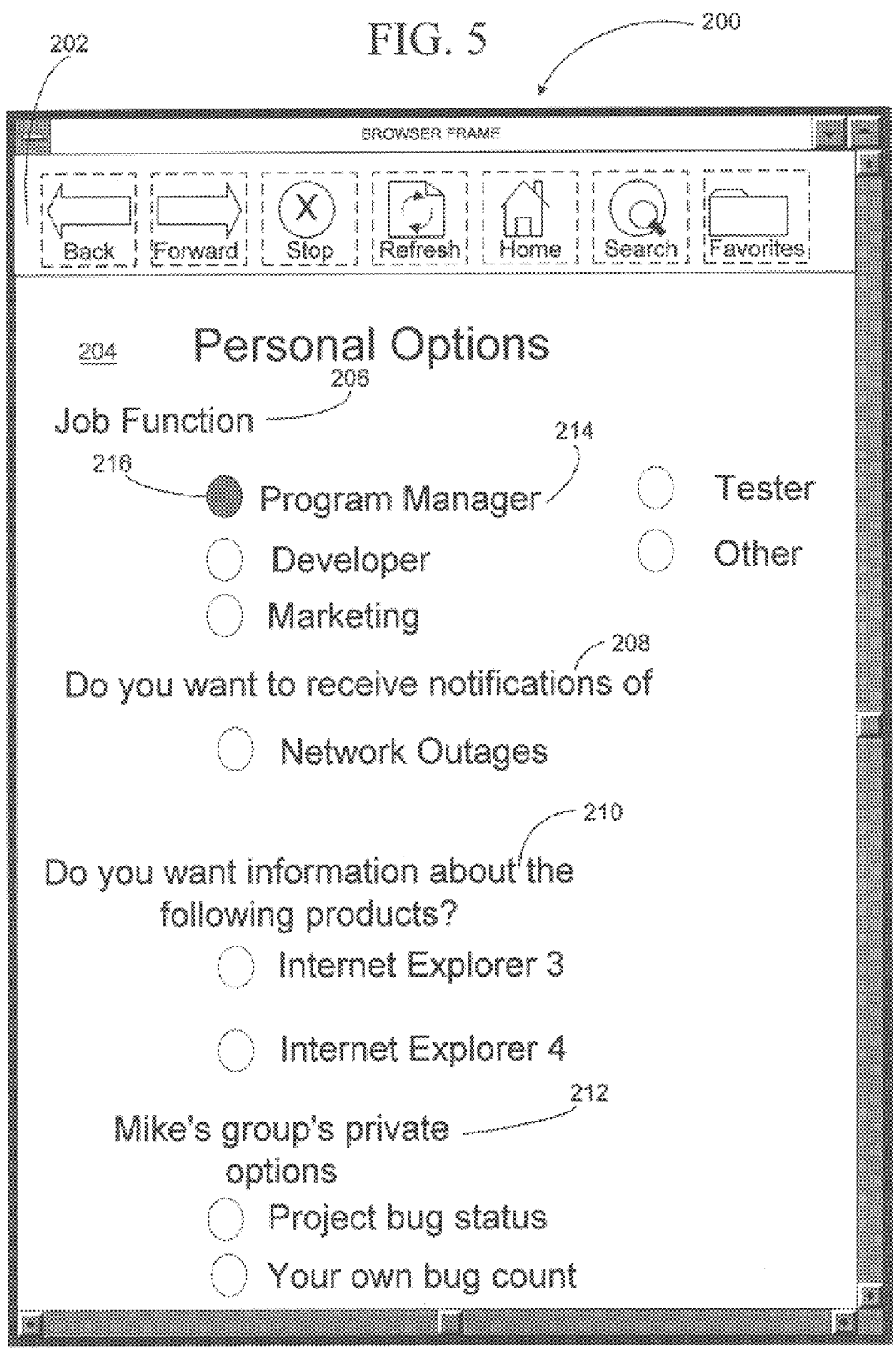
FIG. 5 is an illustration of a personal options page for allowing users to control which messages sent by other users on a computer network are displayed on the ticker display pane.

FIG. 5 shows a browser frame 200 accessible through the system 180 of FIG. 4. The browser frame includes a tool bar 202 used in Microsoft's Internet Explorer version 3.0. A personal options page 204 displayed in the browser frame is accessed from the desktop by using a right click menu option or through a proper keystroke. The personal options page includes a list of user-selectable criteria.

In the illustrated example, the list of criteria includes a job-function category 206, system-status category 208, a product-information category 210 and a private-options category 212. The categories shown are illustrative only and other categories may be used which are related to the particular corporation or business using the active desktop.

Selecting the user-selectable criteria updates the server computer 182 on the system 180 (FIG. 4) so that the user is included in mail groups corresponding to the user-selectable criteria. Mail groups allow other users to provide only a group name or a group option to send messages to all of the individuals within that group. Similarly, de-selecting the criteria will update the server computer so that the user is removed from the associated mail groups. The user, therefore, uses the personal options page 204 to control which messages are sequenced into the ticker display pane.

Although mail groups are used for the illustrated embodiment, the system 180 (FIG. 5) may, alternatively, be designed so that all ticker display messages are received by computer workstations on the network, and the workstations individually check the messages to determine whether the user-selected criteria are satisfied. Having the individual workstations screen messages allows the workstations to work independently of the server so that mail groups stored on the server are not required.

The categories contain options (also called sub-categories) that the user selects to control the type of messages displayed in the ticker display pane.

The job-functions category 206 includes options, such as option 214, indicating the job title of the user. Check boxes, such as check box 216, adjacent each option are darkened or checked to indicate the user has selected that option. For example, the check box 216 is darkened indicating the user wishes to see data relating to program managers. This selection ensures that data items posted to program managers are displayed in the ticker display pane by placing the user in a program-manager mail group. Because program managers have little interest in messages pertaining to marketing, developers, or testers, the user has not selected these options and messages relating to these areas are not included in the display.

Categories 208 and 210 allow a user to choose whether they want messages displayed in the ticker display pane relating to network outages and product information.

Category 212 is a private feed allowing a workgroup within a corporation or business to receive messages for display on the ticker display pane. The options listed under category 212 are customizable so that a workgroup can create new, personal options. For example, a user may desire project status information to be displayed for a particular project they are working on. Or a manager may post a message to his or her team indicating a team meeting is in a conference room in 10 minutes.

Other options (not shown) allow a user to receive general corporate or business messages (e.g., "Tan Volkswagen, license plate number CSN 82H left headlights on").

Figure 6:
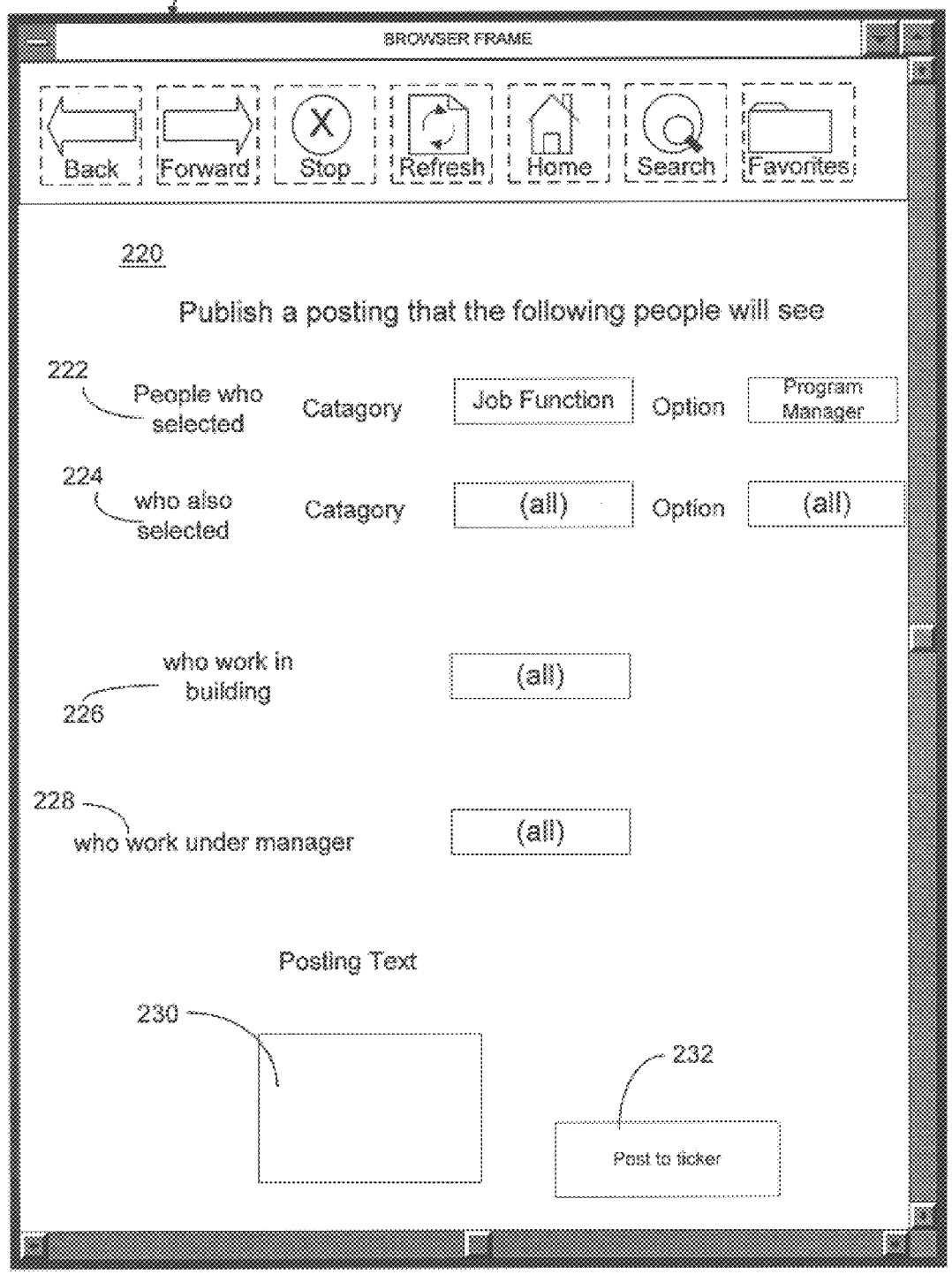
FIG. 6 is an illustration of a posting options page for allowing a user to select which recipients will receive data posted by the user.

FIG. 6 shows the browser frame 200 of FIG. 5 with a posting page 220 being displayed. The posting page allows a user to control which other users on the system 180 (FIG. 4) are sent a posted message. The posting page includes fields 222 and 224 associated with the categories and options shown in FIG. 5. For example, field 222 indicates that anyone who selected "program manager" under the job-function category 206 in their options page 204 (FIG. 5) will be sent posted messages. Field 224 also can be used to further control which users are sent posted messages. Fields 222 and 224 are logically "ANDed" together to obtain the group of users that are sent postings. By ANDing together fields, the user is ANDing together individual mail groups associated with the fields. The user is thereby creating new mail groups that are a logical combination of existing mail groups.

In the illustrated example, field 224 indicates that "all" users shall receive postings. A user may select "all" so that no further logical operations are performed on the newly created mail group. Thus, using fields 222 and 224, any users who selected Program Manager under the job function category will be sent posted messages for display in the ticker display pane.

Fields 226 and 228 further restrict which users are sent data items by specifying a "building" the users work in (for a business with multiple buildings) or a particular manager the users work under. These fields are also logically ANDed with fields 222, 224 to obtain the desired group of users to be sent posted messages. As with the other fields, "all" can be selected if the user wishes no further restrictions to apply.

Although the logical "AND" operator is used in the illustrated embodiment, other logical operators may be used, such as an "OR" operator.

A posting-text pane 230 allows the user to input messages or other data items to be posted or sent to the users designated by fields 222, 224, 226, and 228. After the user enters the message, the user activates button 232 to send the message to all users satisfying the above-described conditions.

Thus, using the channel guide described in Appendix A and the personal options page of FIG. 5, a user can customize data received and displayed on the ticker display pane. The data received is integrated from Internet servers, Intranet servers, LAN servers, and the client computer. The data can be prioritized so that it is displayed next in the substantially continuous sequence of data items displayed, before normally scheduled data items.

5. Displaying Data Items from Multiple Networks and Multiple Server Computers

FIG. 7 illustrates the viewer 140 (FIG. 3) as a hypertext viewer for viewing a ticker HTML document 250. The ticker display is defined by the ticker HTML document 250 that includes an ActiveX control 252 (see section 2, above, and appendix A for details on controls). Based on the ticker HTML document, the viewer displays the source identifier and messages and/or data items as shown in FIG. 3.

The control includes a GetProviderInfo function for reading a user-preference storage 254 on the client computer (the GetProviderInfo function and user-preference storage are further described in appendix A). The control 252 obtains a sequence of URLs stored in the user-preference storage and uses the URLs to retrieve data items or messages from multiple content providers. The content providers can be from multiple server computers on the same network or on multiple networks.

Although shown as displaying an HTML page, a viewer may also be used to display software object components in the form of ActiveX controls, Java applets, and Visual Basic Scripts.

The ticker HTML document sequentially displays one or more data items and the source identifier from each content provider. For example, assume that a content provider 256 is the first content provider listed in the user-preference storage 254. The ticker HTML uses a URL received from the user-preference storage to connect to the content provider 256 via the Internet. One or more data items from the content provider 256 are then displayed in the ticker display pane. The ticker HTML then retrieves the next URL from the user-preference storage and displays data items from the content provider associated with that URL. Each URL may be associated with a different content provider. The URLs can point to Internet content providers, such as content providers 256 and 258, Intranet content providers, such as content providers 260, 262 and LAN content providers, such as content provider 264. This process continues for each URL in the user-preference storage until data items from the last content provider listed in the user-preference storage are displayed. After sequencing through all the content providers, this process repeats, starting again with the first content provider 256.

The client computer 20 also can display messages and or data items on the ticker display pane. For low priority messages, the client computer can update the user-preference storage directly by storing a URL in the user-preference storage. The URL only requires a directory designation and a file name (i.e., /display/message.htm) when the client computer is the content provider. Examples of messages from the client computer may include "low disk space warning," "low memory warning," "incoming e-mail," "print job completed."

High-priority messages from content providers or the client computer may trigger an interrupt, causing the ticker HTML document to display the high priority message next on the ticker display pane, rather than following the order listed in the user-performance storage 254. The speed with which data items scroll across the ticker display may be slower for high-priority messages to provide the user with a greater opportunity to view the message. High-priority messages also may be displayed more frequently.

As explained, the ticker HTML document follows a schedule dictated by the order of the entries in the user-preference storage. Alternatively, a scheduler may be used to generate the order in which data items are displayed.

6. Format of the User-Preference Storage

A simplified example of a user-preference storage entry is as follows:

[Provider name] (key)
     [http://www.espn.com]
     [Ticker display] (key)
       SourceIdentifierURL (/source)
    0(key)
       URL (/baseball)
       style (1 byte binary value)
    1
    2
    . . .
    N This example may be used to display data items from ESPN as illustrated in FIG. 3. The user-preference storage is in the form of a hierarchically structured tree. Each entry node in the tree is called a key. The user-preference storage is similar to a file system, in that each key contains both subkeys (analogous to directories) and data entries (analogous to files).

Under the provider name key, a URL associated with the content provider is saved. In the above example, the URL for ESPN is saved (i.e., http://www.espn.com). Underneath the ESPN URL is a key word "Ticker display" indicating that the information following is to be displayed on the ticker display.

A URL for the source identifier 144 (FIG. 3) is listed underneath the key word "ticker display." This URL is used to retrieve a source identifier from a content provider. The source identifier is typically an image displayed adjacent the moving data items to indicate the content provider sourcing the data items. In the above example, ESPN provides its logo or image indicating it is the source displaying the data items.

Listed underneath the source identifier URL is number keys 0 through N. Each number corresponds to a different URL. The URL shown is a directory only, to be appended to the provider name URL (i.e., http://www.espn.com/baseball). The directory points to data items to be displayed in the ticker display pane.

A ticker display style field listed within key 0 indicates the format of the display. For example, the data items can be displayed as scrolling across the display or flashing, depending on the value of this style field.

Key 1 may contain another URL (e.g., /football) corresponding to data items to be displayed. Any number of keys associated with any number of URLs may be included in the user-preference storage for the content provider. The user may, however, restrict the length of time a content provider displays information in the ticker display pane before data items from the next content provider are displayed.

If the data is obtained through scheduled downloads or during idle time, the user-preference storage may be in format as follows:

[Ticker display] (key)
        SourceIdentifierURL (/source)
        0(key)
            URL (/baseball)
            Update Interval(120)
            Cookie (number)

The update interval controls the time between scheduled downloads. The URL points to a file located on the server which contains the ticker data. The file may be an HTML file, rather than a multi-part MIME.

7. Format for Requesting Data Items from Content Providers

The Ticker HTML document 250 retrieves data items from content providers by using a read request. The read request is a standard HTTP POST, with URL encoded parameters. Each requested element is preceded by an R (Request) keyword. A HTTP POST is used to avoid URL length limitations. The format is as follows:

Content-Type: application/x-www-form-urlencoded
    R=<request1>&R=<request2>&R=<request3>

An exemplary post in this format is as follows:

Content-Type: application/x-www-form-urlencoded
    R=MSFT&R=NSCP&R=BROD&R=YHOO

The response from a server computer is a multi-part MIME (Multipurpose Internet Mail Extensions) encoded message conforming to a standard set forth in RFC 1521 (RFC (Request For Comments) is a document describing a proposed Internet standard). Each MIME element is an HTML fragment that is an individual data item. The response format is as follows:

HTTP/1.0
    Content-Type:Multipart/Mixed;
        boundary=<boundary>
    -<boundary>
    Content-Type:application/prs.ms-tcti
    Time-To-Next-Update=<time in minutes>
    Source-location=<source html file URL>
    Source-file=<optional file that must be downloaded for
        source HTML page>
    -<boundary>
    Content-Type: Text/prs.ms-thtml;tag=<tag1>
    <first HTML snippet>
    -<boundary>
    Content-Type:Text/prs.ms-thtml;tag=<tag1>
    <second HTML snippet>
    -<boundary>

An example response in this format is as follows:

MIME=Version:1.0
    Content-Type:Multipart/Mixed;
        boundary=foo
    -foo
    Content-Type:application/prs.ms-tcti
    Time-To-Next-Update=15
    Source-location=http://www.quote.com/images/logo.htm
    Source-file=http://www.quote.com/objects/fancy.ocx
    Source-file=
        http://www.quote.com/random/random.data
    -foo
    Content-Type: Text/prs.ms-thtml;tag=MSFT
    <b>MSFT<b><br>
    14.5<br>
    <font color=green>+1.5</font><br>
    -foo
    Content-Type:Text/prs.ms-thtml;tag=NSCP
    <b>NSCP</b><br>
    42<br>
    -<font color=red>−5</font><br>
    -foo The different embodiments of the above-described graphical user interface provide numerous advantages over the prior art. A short summary of the primary advantages is as follows:

1) The ticker display pane is part of the desktop so that a separate application window need not be opened to display the ticker data items. Thus, the user always knows the location of the ticker display pane, even when many windows are opened. Additionally, the user is less likely to close the ticker display because it is not in a window (i.e., users typically close windows so that they don't interfere with other windows). Of course, the ticker may also be displayed in a window if desired.

2) The data items displayed in the ticker display pane can be sourced from multiple networks, such as LAN, and Internet and Intranet Networks.

3) The data items are hypertext allowing users to obtain more information about a currently displayed data item by activating (e.g., clicking on) the data item.

4) A source identifier is displayed that indicates the content provider sourcing the currently displayed ticker data items. The source identifier may also be hypertext allowing a user to obtain more information about the content provider.

5) The ticker display data can be messages of any length (limited, of course, to the physical limitations of the computer 20) sent between users on the same or different networks. A user can use a personal options page for controlling which messages posted on a network are displayed in the ticker display pane.

6) The ticker data items are displayed in a substantially continuous sequence. The sequence of data items can relate to multiple topics of information and be supplied from multiple content providers.

7) A user can use a posting page to choose which users receive posted messages. Using the postings page, mail groups can be combined using logical operators so that only certain members of a mail group are sent messages.

Having described and illustrated the principles of our invention with reference to an illustrated embodiment, it will be recognized that the illustrated embodiment can be modified in arrangement and detail without departing from such principles. It should be understood that the programs, processes, or methods described herein are not related or limited to any particular type of computer apparatus, unless indicated otherwise. Various types of general purpose or specialized computer apparatus may be used with or perform operations in accordance with the teachings described herein. Elements of the illustrated embodiment shown in software may be implemented in hardware and vice versa.

In view of the many possible embodiments to which the principles of our invention may be applied, it should be recognized that the detailed embodiments are illustrative only and should not be taken as limiting the scope of our invention. Rather, we claim as our invention all such embodiments as may come within the scope of the following claims and equivalents thereto.

We claim:

1. A method for displaying data on a client computer having a graphical user interface including a desktop display and a windowing environment, the method comprising:

providing a ticker display pane integrated into the desktop display so that it is part of an operating system on the client computer, wherein the desktop display is a full-screen display that cannot be minimized and wherein the desktop display includes icons representing programs;

retrieving a plurality of discrete data from at least one source computer, wherein the plurality of discrete items includes a first data item having a hyperlink embedded therein; and sequentially displaying the plurality of discrete data items in the ticker display pane.

2. The method of claim 1 further including animating the plurality of discrete data items in the ticker display pane.

3. The method of claim 2 wherein animating includes scrolling the discrete data items across the ticker display pane.

4. The method of claim 1 wherein the sequentially displaying step includes displaying multiple discrete data items simultaneously on the ticker display pane.

5. The method of claim 1 including connecting to a computer network from the client computer, the computer network having a plurality of server computers; and wherein the at least one source computer includes a first server computer on the computer network for providing at least the first data item which is sequentially displayed in the ticker display pane.

6. The method of claim 5 wherein the at least one source computer includes a second server computer on the computer network for providing at least a second data item which is sequentially displayed in the ticker display pane.

7. The method of claim 5 wherein the computer network is a first computer network and the method further includes connecting to a second computer network, the at least one source computer further including a second server computer on the second computer network for providing at least a second data item which is sequentially displayed in the ticker display pane.

8. The method of claim 7 wherein the first computer network is an Internet computer network and the second computer network is one of an Intranet computer network and a Local Area Network.

9. The method of claim 7 wherein the at least one source computer further includes the client computer for providing at least a third data item which is sequentially displayed in the ticker display pane.

10. The method of claim 1 wherein the plurality of data items includes a first data item associated with a first user-selected channel and a second data item associated with a second user-selected channel, the first and second user-selected channels relating to different topics of information.

11. The method of claim 1 further including displaying a source identifier within the ticker display pane for identifying a source of a currently displayed data item.

12. The method of claim 11 wherein the source identifier includes a hyperlink referencing a document for causing the client computer to retrieve and display the document upon activation of the hyperlink.

13. The method of claim 1 wherein the ticker display pane is not minimizable.

14. The method of claim 1 wherein the windowing environment supports a plurality of windows displayed on the client computer according to a front-to-back order, wherein windows in the front of the order overlap windows further back in the order, and wherein the desktop is a full-screen display which the windows overlay.

15. A computer readable medium having stored therein instructions capable of causing a computer to perform the method of claim 1.

16. The method of claim 1 wherein the desktop further includes a pane for displaying desktop icons unrelated to the plurality of discrete data items.

17. A method for displaying data on a client computer having a graphical user interface including a desktop and a windowing environment, the method comprising:

providing a ticker display pane for displaying data in the graphical user interface, wherein the ticker display pane is integrated into an operating system on the client computer by having the ticker display pane part of the desktop;

retrieving a plurality of discrete data items from at least a first server computer, the plurality of discrete data items including a first data item having a hyperlink embedded therein, wherein the first data item is part of a first document stored on the first server computer and the hyperlink is for establishing communications with a second server computer designated by the hyperlink and for displaying a second document stored on the second server computer; and sequentially displaying the plurality of discrete data items in the ticker display pane.

18. The method of claim 17 further including animating the plurality of discrete data items in the ticker display pane.

19. The method of claim 18 wherein animation includes scrolling the discrete data items in the ticker display pane.

20. The method of claim 17 wherein the sequentially displaying step includes displaying multiple discrete data items simultaneously on the ticker display pane.

21. The method of claim 17 including connecting to a first computer network from the client computer, the computer network having a plurality of server computers; and wherein the first server computer is on the first computer network.

22. The method of claim 21 wherein the second server computer is on the first computer network.

23. The method of claim 21 further including connecting to a second computer network, wherein the second server computer is on the second computer network.

24. The method of claim 23 wherein the first computer network is an Internet computer network and wherein the second computer network is one of an Intranet computer network and a Local Area Network.

25. The method of claim 23 wherein the at least a first server computer further includes the client computer for providing at least a third data item which is sequentially displayed in the ticker display pane.

26. The method of claim 17 wherein the first data item is associated with a first user-selected channel and a third data item to be displayed in the ticker display pane is associated with a second user-selected channel, the first and second user-selected channels relating to different topics of information.

27. The method of claim 17 further including displaying a source identifier within the ticker display pane for identifying a source of a currently displayed data item.

28. The method of claim 27 wherein the source identifier includes a hyperlink referencing a document for causing the client computer to retrieve and display the document upon activation of the hyperlink.

29. The method of claim 17 wherein the ticker display pane is not minimizable.

30. The method of claim 17 wherein the windowing environment supports a plurality of windows displayed on the client computer according to a front-to-back order, wherein windows in the front of the order overlap windows further back in the order, and wherein the desktop is a full-screen display which the windows overlay.

31. A compute readable medium having stored thereon instructions capable of causing a computer to perform the method of claim 17.

32. The method of claim 17 wherein the desktop further includes a pane for displaying desktop icons unrelated to the plurality of discrete data items.

33. A method for displaying a sequence of data items on a client computer, the method comprising the steps of:

providing a ticker display pane on the client computer for displaying the sequence of data items;

connecting to a computer network from the client computer, the computer network having a plurality of server computers;

retrieving a first data item from a first server computer connected to the computer network;

retrieving a second data item from a second server computer connected to the computer network; and integrating the first and second data items into the sequence of data items displayed on the ticker display pane, wherein at least one of the data items in the sequence includes a hyperlink referencing a document for retrieving and displaying the document upon activation of the hyperlink.

34. The method of claim 33 wherein the computer network is a first computer network and the method includes connecting to a third server computer on a second computer network and retrieving a third data item from the third server computer for integration into the sequence of data items.

35. The method of claim 33 including providing a desktop having a first pane for displaying the sequence of data items and a second pane for displaying desktop icons unrelated to the sequence of data items, wherein the first pane is the ticker display pane.

36. The method of claim 33 further including integrating a data item provided from the client computer into the sequence of data items displayed on the ticker display pane.

37. The method of claim 33 further including displaying a source identifier for displaying an image indicating the source of a currently displayed data item in the sequence of data items.

38. The method of claim 37 wherein the source identifier includes a hyperlink referencing a document for retrieving and displaying the document upon activation of the hyperlink.

39. The method of claim 33 further including animating the sequence of discrete data items in the ticker display pane.

40. The method of claim 39 wherein animation includes scrolling the discrete data items in the ticker display pane.

41. The method of claim 19 wherein the displaying of the sequence of data items includes displaying multiple discrete data items simultaneously on the ticker display pane.

42. The method of claim 19 further including connecting to a second computer network, the second computer network having a third server computer, the third server computer for providing at least a third data item which is integrated into the sequence of data items displayed in the ticker display pane.

43. The method of claim 19 wherein the first computer network is an Internet computer network and wherein the second computer network is one of an Intranet computer network and a Local Area Network.

44. The method of claim 19 wherein the first data item is associated with a first user-selected channel and the second data item to be displayed in the ticker display pane is associated with a second user-selected channel, the first and second user-selected channels relating to different topics of information.

45. The method of claim 19 wherein the ticker display pane is not minimizable.

46. A compute readable medium having stored thereon instructions capable of causing a computer to perform the method of claim 19.

* * * * *

UNITED STATES PATENT AND TRADEMARK OFFICE
CERTIFICATE OF CORRECTION

PATENT NO.    : 6,421,694 B1
DATED         : July 16, 2002
INVENTOR(S)   : Nawaz et al.

It is certified that error appears in the above-identified patent and that said Letters Patent is hereby corrected as shown below:

<u>Column 18,</u>
Lines 25, 27, 30, 36, 40, 46 and 50, "The method of claim 19" should read
-- The method of claim 33 --.

Signed and Sealed this

Nineteenth Day of August, 2003

JAMES E. ROGAN
*Director of the United States Patent and Trademark Office*